United States Patent [19]

Gondard et al.

[11] Patent Number: 5,395,887
[45] Date of Patent: *Mar. 7, 1995

[54] PROCESS FOR CROSS-LINKING CHLORINATED (CO)POLYMERS, CROSS-LINKABLE COMPOSITIONS AND SHAPED OBJECTS

[75] Inventors: Christian Gondard, Roanne; Alain Michel, Lyons, both of France

[73] Assignees: Centre National de la Recherche Scientifique, Paris; Sotra Industries, Andresy, both of France

[*] Notice: The portion of the term of this patent subsequent to Nov. 30, 2010 has been disclaimed.

[21] Appl. No.: 773,911

[22] PCT Filed: Dec. 28, 1990

[86] PCT No.: PCT/FR90/00967
  § 371 Date: Oct. 28, 1991
  § 102(e) Date: Oct. 28, 1991

[87] PCT Pub. No.: WO91/09902
  PCT Pub. Date: Jul. 11, 1991

[30] Foreign Application Priority Data

Dec. 28, 1989 [FR] France .................. 89 17357

[51] Int. Cl.⁶ .............. C08L 11/00; C08L 27/04
[52] U.S. Cl. .................. 525/125; 525/123; 525/131; 525/179; 525/183; 525/184; 525/195; 525/196; 525/330.5; 525/331.1; 525/331.4; 525/331.5; 525/334.1; 525/360; 525/370

[58] Field of Search ............ 525/331.5, 360, 330.5, 525/330.6, 334.1, 331.1, 331.4, 125, 123, 131, 179, 183, 184, 195, 196

[56] References Cited

U.S. PATENT DOCUMENTS

| | | | |
|---|---|---|---|
| 3,222,317 | 12/1965 | Kauder | 260/45.75 |
| 3,752,837 | 8/1973 | Okuto et al. | 260/446 |
| 4,028,337 | 6/1977 | Starnes, Jr. | 260/457.55 |
| 4,647,629 | 3/1987 | Michel et al. | 525/350 |
| 5,266,637 | 11/1993 | Gondard et al. | 525/104 |

FOREIGN PATENT DOCUMENTS 2059168 5/1971 France .

OTHER PUBLICATIONS

Database WPIL, No. 86-263020, Derwent Publications Ltd., London, GB, & JP-A-53 139 659 (Osaka Soda K.K) Jun. 12, 1978.

*Primary Examiner*—Ana L. Carrillo
*Attorney, Agent, or Firm*—Browdy and Neimark

[57] ABSTRACT

A method for cross-linking chlorinated (co)polymers involves reacting such (co)polymers at between 50° and 230° C. in the absence of solvent with an organometallic amino-type derivative of tin, lead, antimony or bismuth to provide cross-linked compositions and shaped objects.

20 Claims, No Drawings

PROCESS FOR CROSS-LINKING CHLORINATED (CO)POLYMERS, CROSS-LINKABLE COMPOSITIONS AND SHAPED OBJECTS

The present invention relates to a process for cross-linking chlorinated polymers or (co)polymers (hereafter (co)polymers), cross-linkable compositions and shaped objects.

A more particular subject of the present invention is a process for cross-linking (co)polymers, by themselves or in mixtures, which can notably be integrated into industrially viable operations such as extrusion, calendering, coating, injection molding or after types of molding.

The cross-linking of a polymer creates a three-dimensional network, the consequence of which is to increase the molecular weight. The cross-linking bridges create intermolecular bonds which thus limit the movement of polymer chains relative to one another and consequently strongly limit the flow behaviour of these chains. The cross-linking of a thermoplastic polymer therefore has the significant consequence of moving its thermoplastic threshold towards high temperatures and of improving its resistance to plastic flow over a greater temperature range and thus allows improved dimensional stability of formed objects to be obtained.

Several methods have been proposed for cross-linking thermoplastics such as polyvinyl chloride and polyolefines. They are either based on radical-like reactions, or on condensation reactions or nucleophilic substitution. For example concerning polyvinyl chloride, attempts have been made at cross-linking using photochemical means, by electron bombardment and by gamma irradiation by subjecting the polymer to these radiations in the presence of a multifunctional monomer such as, for example, tetraethyleneglycol dimethacrylate or trimethylolpropane trimethacrylate, the cross-linking reaction being ensured by the grafting and polymerization of these multifunctional monomers onto the polymer skeleton. The major disadvantage of these methods for polyvinyl chloride is its sensibility to these radiations which encourage its degradation by the elimination of HCl in a cascade process. Moreover, the cross-linking mechanism is difficult to control because the polymerization and grafting of the functional monomers onto the polymer skeleton brings about transfer reactions.

Furthermore, to obtain a homogeneous and effective cross-linking, the quantities of multifunctional monomer must be quite high, which has the consequence of modifying the intrinsic properties of the crosslinked polyvinyl chloride. Finally, methods by gamma radiation or by electron bombardment require a high level of technology and expensive apparatus.

To overcome these disadvantages, methods are proposed based on radical-like grafting of functionalized monomers initiated by peroxides. These functionalized monomers can contain, for example, alkoxysilane groups which lead, by hydrolysis and polycondensation, to silanol groups and to cross-linking. It is in this way that the process known by the process name SIOPLAST from Dow Chemical was developed for the cross-linking of polyethylene, notably for cable making applications. However, this process has the disadvantage of creating a cross-linking density gradient, because this is governed by the diffusion of water in the finished object, water which is required for the hydrolysis reaction of the alkoxysilane functions.

For polyvinyl chloride, methods calling on a nucleophilic substitution reaction of the chlorine atoms by alkaline or alkaline-earth thiolates or alkaline or alkaline-earth mixed thiolate-carboxylate compounds, are proposed. These methods are principally well adapted to implementation by coating but they are clearly less so for extrusion or calendering processes. But their major disadvantage lies in the fact that they strongly encourage reticulated materials towards photochemical degradation induced by by-products such as disulphides. For this reason, the development of these processes is not widespread.

Therefore a process for cross-linking chlorinated polymers or copolymers is constantly being sought, which is simple, inexpensive and can be used in the absence of a solvent and with simple heating, in such a way as to be compatible with standard methods of forming polymers such as by extrusion, injection molding, calendering, coating, molding and thermoforming.

This is why a subject of the present invention is a process for cross-linking chlorinated (co)polymers and mixtures of chlorinated (co)polymers and (co)polymers containing NH functions, characterized in that an organometallic amino-type compound of formula (I):

$$(R)_n Me(NR'')_{m-n} R'$$

in which:
Me represents a tin, lead, antimony or bismuth atom, preferably tin,
R represents a linear or branched alkyl radical containing 1 to 8 carbon atoms, a cycloalkyl radical containing 3 to 12 carbon atoms, an optionally substituted aryl radical containing 6 to 14 carbon atoms, an optionally substituted aralkyl radical containing 7 to 14 carbon atoms or a cycloalkylalkyl radical containing 4 to 8 carbon atoms,
R' represents a linear or branched alkyl radical containing 1 to 20 carbon atoms, an aralkyl radical containing 7 to 14 carbon atoms, a cycloalkyl radical containing 3 to 12 carbon atoms, a cycloalkylalkyl radical containing 4 to 8 carbon atoms, an arylcycloalkyl radical containing 10 to 20 carbon atoms or a polymer chain, said radical R' being divalent, and further being optionally functionalized, that is substituted by a function such as ether, thioether, hydroxyl, which is not capable of destroying the reagents employed,
m is equal to 4 and n is equal to 1 or 2, when Me represents tin or lead,
m is equal to 5 and n is equal to 1, 2 or 3 when Me represents bismuth or antimony,
and R'' represents a hydrogen atom or one of the meanings of R', is reacted with said (co)polymer, between 50° and 230° C., and in the absence of a solvent.

The process described above can be employed both vis-à-vis a chlorinated (co)polymer and mixtures of chlorinated copolymers or also mixtures of chlorinated (co)polymers and polymers containing NH functions.

The linear or branched alkyl radical preferably designates a methyl, ethyl, n-butyl or n-octyl radical.

The expression "cycloalkyl radical containing 3 to 6 carbon atoms" preferably designates a cyclopropyl, cyclobutyl or cyclohexyl radical.

The expression "aryl radical containing 6 to 14 carbon atoms" preferably designates a phenyl radical.

The expression "aralkyl radical containing 7 to 14 carbon atoms" preferably designates a benzyl or phenethyl radical.

The expression "cycloalkylalkyl radical containing 4 to 8 carbon atoms" preferably designates a cyclopropylmethyl radical.

The linear or branched alkyl radical containing 1 to 20 carbon atoms preferably contains 2 to 6 carbon atoms.

When an aryl is substituted, it is preferably substituted by an ethyl, methyl, methoxy, chloro or amino radical.

By "organometallic amino-type compound, is meant that the metal atom is linked to a carbon atom of the R radical by a covalent bond and to the nitrogen atom also by a covalent bond.

When n=1, 2 or 3, according to the nature of the metal, the organometallic derivative derives:

from a polyamine, advantageously a diamine, and it is then of cyclic type, at least two nitrogen atoms linked to the metal atom being connected by a hydrocarbon remainder.

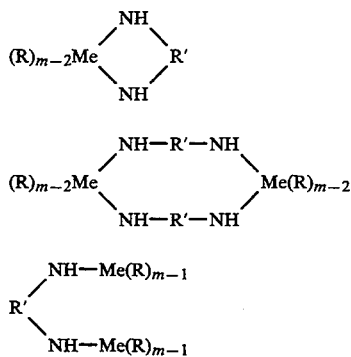

R and R' have the meanings indicated.

The chlorinated (co)polymers can be, for example, polyvinyl chloride, the (co)polymers of polyvinyl chloride and vinyl acetate or acrylic and methacrylic esters, polyvinylidene chloride, polychloroprene, chlorinated rubbers and chlorinated polyethylenes.

The (co)polymers containing NH functions can be, for example, polyamides such as 12 polyamide, polyurethanes or polyureas or their copolymers.

According to the present invention, the organometallic amino-type derivative, for example in the case of tin, can be synthesized before its introduction into the (co)polymer or mixture of (co)polymers, for example by standard synthesis routes such as the reaction of a polymer, advantageously a diamine, with an alkoxy organotin such as dimethoxydibutyltin or tin oxide.

The organometallic amino derivative can also be prepared in situ by the interaction notably of an organometallic oxide and a compound containing at least two NH functions.

In the preferred conditions for implementing the process described above, the organometallic amino derivative is derived from a (co)polymer, notably from a polyamide.

In the other preferred conditions for implementing the process described above:

the chlorinated (co)polymer is polyvinyl chloride;

the chlorinated (co)polymer is chlorinated polyethylene;

the (co)polymer containing the NH functions is a polyamide;

the (co)polymer containing the NH functions is a polyurethane or a polyurea.

There can be quite particularly mentioned the co-cross-linking of polyvinyl chloride with the 12 polyamide and the co-cross-linking of chlorinated polyethylene with the 12 polyamide.

Also a subject of the invention is cross-linkable compositions, characterized in that they contain a chlorinated (co)polymer, a polymer derivative containing at least two NH functions and an organometallic amino derivative as defined above.

As has already been indicated, this latter can be synthesized beforehand or prepared in situ.

More particularly a subject of the present Application is cross-linkable compositions, characterized in that they contain a chlorinated (co)polymer and an organometallic amino-type derivative as defined above.

Also a subject of the invention is cross-linkable compositions, characterized in that they contain a chlorinated (co)polymer and a (co)polymer containing at least two NH functions and an organometallic oxide.

When it is said that a composition contains a certain product, it means that it contains at least one product of this type, for example at least one chlorinated polymer.

The compositions according to the invention can moreover contain the adjuvants normally used in the plastic materials industry, fillers, plasticizers, antioxidants, stabilizers, pigments, lubricants etc. These constituents can be added at the start of the process during the stage of mixing the cross-linkable products.

Among the fillers, there can be mentioned calcium carbonates, talc or titanium oxide.

Among the plasticizers, there can be mentioned the phthalates such as di(ethyl-2-hexyl) phthalate.

As stabilizers, there can be mentioned for example metallic soaps, notably lead, calcium, zinc or organotin and organotin thioglycolates.

Among the pigments, there can be mentioned for example, carbon black, titanium oxide and cobalt blue.

An advantage according to the present invention is the control and adaptation of the cross-linking density as a function of the desired properties by controlling the concentration of the reactive types of the cross-linkable composition, notably the concentration of organotin amino and the composition of chlorinated (co)polymers in the case of mixtures containing one polymer or polymers containing at least two NH functions, for example, polyamides.

According to an advantage of the present invention, the cross-linking temperature can be adapted as a function of the process implemented for compositions of this invention in such a way that the cross-linking is not too advanced in the forming phase of standard processes such as extrusion, calendering, injection, coating and moulding, the cross-linking being terminated after the forming stage, for example in a cooling jig or inside a mould in the case of injection, by adjusting the time and temperature parameters.

According to the invention, the properties of plastic flow behaviour and dimensional stability of the shaped polymer objects will be clearly improved after cross-linking.

According to the invention, the co-cross-linking of mixtures of chlorinated (co)polymers with polyamides is also a means of stabilizing these mixtures vis-à-vis segregation phenomena.

According to the invention, the co-cross-linking of the polyamide with the chlorinated polyethylene in the elastomer phase is a means of improving the properties of the polyamide vis-à-vis impacts.

Finally the present Application relates to shaped objects, characterized in that they are prepared from products obtained by the implementation of the process described above, as well as formed objects composed of a composition as defined above.

The examples which follow illustrate the invention without however limiting it.

The cross-linking of chlorinated (co)polymers as well as the co-cross-linking of these chlorinated (co)polymers with (co)polymers containing at least two NH functions according to the invention, are characterized in the dynamic phase using a Haake plastograph equipped with a Rheomix 600 type internal mixer with 60 ml capacity. This apparatus allows the continuous monitoring of the evolution of the load moment exerted by the polymer on the mixer blades. The cross-linking of the polymer results in an increase in the moment which is observed either simultaneously or after the thickening or melting of the polymer. The variation of the moment ΔM between the moment attained after thickening or melting (Mmin) and the maximum moment (Mmax) attained at the end of the experiment is a cross-linking criterion.

Two other criteria have been used to evaluate the reaction kinetics in the dynamic phase: the time Ti at the end of which an increase in the load moment is produced, characteristic of a significant cross-linking, and the speed of increase of the moment between the maximum value (Mmax) and the minimum value (Mmin) is comparable to the average speed of cross-linking.

Another criterion characterizing the degree of cross-linking of a polymer is the percentage of the insoluble fraction in one of its solvents, for example tetrahydrofuran (THF) for polyvinyl chloride and its copolymers.

The cross-linking according to the present invention has also been monitored in static conditions using a press with heated plates after thickening or melting in the Rheomix 600 internal mixer fitted to the Haake plastograph in order to obtain good homogenization of the reagents and the (co)polymers. This first phase being achieved, the thickened or fused material is transferred to a rectangular mould of 3 mm depth itself placed between the plates of a heating press.

After a curing interval at a given temperature, generally 5 minutes, the moulded plate is rapidly cooled down. The degree of cross-linking in these conditions is evaluated as previously by the proportion of insoluble polymer in one of its solvents and/or by the proportion of swelling in this solvent, defined by the relationship:

$$G = \frac{(Ms - Mf)/\rho s + Mp/\rho P}{Mp/\rho P}$$

Ms being the mass of swollen sample, Mp the mass of insoluble polymer, $\rho s$ and $\rho p$ being the respective volumetric masses of solvent and polymer. For THF $\rho s = 0.948$ g/ml and for polyvinyl chloride $\rho p = 1.38$ g/ml.

In all the following examples, the thermal stabilizer used is isooctyl dioctyltin dithioglycolate, at the rate of 2 g per 100 g of polymer and the rotational speed of the Rheomix 600 mixer is 50 revolutions per minute.

Table I shows the principal characteristics of cross-linking polyvinyl chloride with ethanediamino-1,2-dibutyltin in the dynamic phase, the temperatures exhibited by the walls of the mixer being 200° C. After four and a half minutes of mixing, the proportion of insoluble polymer in the THF is greater than 50%.

TABLE 1

| | cross-linking of polyvinyl chloride with ethanediamino-1,2-dibutyltin in the dynamic phase at 200° C. | | | | | |
|---|---|---|---|---|---|---|
| Example | Ethanediamino-1,2 dibutyltin (mole · kg$^{-1}$) | Tm (mn) | Ti (mn) | Mmax (Nm) | ΔM (Nm) | Sc (Nm · mn$^{-1}$) |
| 1 | 0.17 | 4.5 | 3.5 | 46 | 8 | 8 |

Table II shows the characteristics of cross-linking a mixture of 12 polyamide-chlorinated polyethylene at 36% chlorine in the presence of dibutyltin oxide as intermediate compound for synthesizing the crosslinked compound in situ. In this example the temperature of the mixer walls is 200° C. and the 12 polyamide is mixed for 10 minutes with the chlorinated polyethylene in order to reach a steady value of the moment before introduction of the dibutyltin oxide which causes an increase in the moment for two and a half minutes, before it reaches a new steady value. The crosslinked compound is synthesized in situ by the interaction of amide groups with tin oxide.

TABLE II

| | Co-cross-linking of 12 polyamide and chlorinated polyethylene with diamino dibutyltin prepared in situ, polyamide derivative. | | | | | | | |
|---|---|---|---|---|---|---|---|---|
| Example | 12 Polyamide (%) | Chlorinated Polyethylene (%) | Dibutyltin oxide (mole · kg$^{-1}$) | Tm (mn) | Ti (mn) | Mmax (Nm) | ΔM (Nm) | Sc (Nm · mn$^{-1}$) |
| 2 | 91 | 9 | 0.182 | 2.5 | 0 | 12.8 | 8.8 | 3.5 |

Table III sets out the principal characteristics of the co-cross-linking of polyvinyl chloride and 12 polyamide in the dynamic phase at 205° C. with the diamino dibutyltin compound synthesized in situ by the interaction of amide groups and dibutyltin oxide.

TABLE III

| | Co-cross-linking of polyvinyl chloride and 12 polyamide with the diamino dibutyltin prepared in situ. | | | | | | | |
|---|---|---|---|---|---|---|---|---|
| Example | Polyvinyl chloride (%) | Polyamide (%) | Dibutyltin oxide (mole · kg$^{-1}$) | Tm (mn) | Ti (mn) | Mmax (Nm) | ΔC (Nm) | Sc (Nm · mn$^{-1}$) |
| 3 | 70 | 30 | 0.240 | 9 | 5.5 | 17.4 | 1 | 0.25 |

In this example, the proportion of insoluble polymer in THF is greater than 50%, which proves that the polyvinyl chloride and the polyamide are co-cross-linked.

Table IV shows examples of co-cross-linking polyvinyl chloride and 12 polyamide in the static phase at 205° C. and under a pressure of 10 bars between the plates of a heating press. The co-cross-linking is achieved over 5 minutes at this temperature after mixing the mixture of polymers and dibutyltin oxide in the Rheomix 600 internal mixer for 9 minutes at 200° C. In these conditions, for Example 4, the proportion of insoluble in THF after 48 hours of immersion, reaches 97% and the proportion of swelling is 2.5.

TABLE IV

Co-cross-linking of a mixture of polyvinyl chloride - 12 polyamide in the static phase at 205° C. with the cyclodiamino dibutyltin compound formed by the interaction of amide groups and dibutyltin oxide.

| Examples | Polyvinyl chloride (%) | 12 Polyamide (%) | Dibutyltin oxide (mole · kg$^{-1}$) | Insoluble proportion (%) | Swelling proportion (%) |
|---|---|---|---|---|---|
| 4 | 70 | 30 | 0.240 | 97 | 2.5 |
| 5 | 85 | 15 | 0.240 | 38 | |

We claim:

1. A process for cross-linking a chlorinated (co)polymer or a mixture of chlorinated (co)polymers comprising
reacting an amino organometallic compound of formula (I):

$$(R)_nMe(NR'')_{m-n}R' \qquad (I)$$

in which:
Me represents a tin, lead, antimony or bismuth atom,
a represents a linear or branched alkyl radical containing 1 to 8 carbon atoms, an aralkyl radical containing 3 to 12 carbon atoms, an aryl containing 6 to 14 carbon atoms, an aralkyl radical containing 7 to 14 carbon atoms or a cycloalkylalkyl radical containing 4 to 8 carbon atoms,
R' is divalent and represents a linear or branched alkyl radical containing 1 to 20 carbon atoms, an aralkyl radical containing 7 to 14 carbon atoms, a cycloalkyl radical containing 3 to 12 carbon atoms, a cycloalkylalkyl radical containing 4 to 8 carbon atoms, an arylcycloalkyl radical containing 10 to 20 carbon atoms or a polymer chain selected from the group consisting of polyamides, polyurethanes, polyureas and copolymers thereof,
m is equal to 4 and n is equal to 1 or 2, when Me represents tin or lead,
m is equal to 5 and n is equal to 1, 2 or 3 when Me represents bismuth or antimony,
and R'' represents a hydrogen atom or one of the meanings of R',
with said chlorinated (co)polymer, between 50° and 230° C., and in the absence of a solvent.

2. Process according to claim 1, characterized in that the amino organometallic compound is derived from a (co)polymer containing at least two NH functions.

3. Process according to claim 2, characterized in that the (co)polymer containing the NH functions is a polyamide.

4. Process according to claim 2, characterized in that the (co)polymer is a polyurethane or a polyurea.

5. Process according to claim 2, wherein the chlorinated co-polymer is polyvinyl chloride.

6. Process according to claim 5, wherein the copolymer containing the NH functions is a polyamide, a polyurethane or a polyurea.

7. Process according to claim 1, characterized in that the chlorinated (co)polymer is polyvinyl chloride.

8. Process according to claim 1, characterized in that the amino organometallic compound is prepared in situ.

9. Process according to claim 1, wherein Me is tin.

10. A process according to claim 1 wherein when R is an aryl radical containing 6 to 14 carbon atoms, or an aralkyl radical containing 7 to 14 carbon atoms, said radical is unsubstituted or is substituted with ethyl, methyl, methoxy, or amino.

11. A process according to claim 1 wherein said R' radical is substituted by ether, thioether or hydroxyl.

12. Shaped objects, characterized in that they are prepared starting from the products obtained by the implementation of the process according to claim 1.

13. A shaped object prepared according to the process of claim 2.

14. A shaped object prepared according to the process of claim 5.

15. A cross-linkable composition, comprising a chlorinated (co)polymer or a mixture of a chlorinated (co)polymers; and an amino organometallic compound of formula (I):

$$(R)_nMe(NR'')_{m-n}R'$$

in which:
Me represents a tin, lead, antimony or bismuth atom,
R represents a linear or branched alkyl radical containing 1 to 8 carbon atoms, a cycloalkyl radical containing 3 to 12 carbon atoms, an aryl radical containing 6 to 14 carbon atoms, an aralkyl radical containing 7 to 14 carbon atoms or a cycloalkylalkyl radical containing 4 to 8 carbon atoms,
R' is divalent and represents a linear or branched alkyl radical containing 1 to 20 carbon atoms, an aralkyl radical containing 7 to 14 carbon atoms, a cycloalkyl radical containing 3 to 12 carbon atoms, a cycloalkylalkyl radical containing 4 to 8 carbon atoms an arylcycloalkyl radical containing 10 to 20 carbon atoms or a polymer chain selected from the group consisting of polyamides, polyurethanes, polyureas and copolymers thereof,
m is equal to 4 and n is equal to 1 or 2, when Me represents tin or lead,
m is equal to 5 and n is equal to 1, 2 or 3 when Me represents bismuth or antimony,
and R'' represents a hydrogen atom or one of the meanings of R'.

16. A composition according to claim 15 wherein Me is tin.

17. A cross-linkable composition comprising (a) a chlorinated copolymer or a mixture of chlorinated co-polymers, and (b1) an amino organo-metallic compound of formula $$(R)_nMe(NR'')_{m-n}R',$$

or a (b2) mixture of (i) an organometallic oxide and (ii) a copolymer containing at least 2 NH functions capable of reacting with said organometallic oxide to form in situ said amino organo metallic compound, wherein Me represents a tin, lead, antimony or bismuth atom, R represents a linear or branched alkyl radical containing 1 to 20 carbon atoms, a cycloalkyl radical containing 3 to 12 carbon atoms, an aryl radical containing 6 to 14 carbon atoms, an aralkyl radical containing 7 to 14 carbon atoms or a cycloalkylalkyl radical containing 4 to 8 carbon atoms, R' is divalent and represents a linear or branched alkyl radical containing 1 to 20 carbon atoms, an aralkyl radical containing 7 to 14 carbon atoms, a cycloalkyl radical containing 3 to 12 carbon atoms, a cycloalkylalkyl radical containing 4 to 8 carbon atoms, an arylcycloalkyl radical containing 10 to 20 carbon atoms or a polymer chain selected from the group consisting of polyamides, polyurethanes, polyureas and copolymers thereof, m is equal to 4 and n is equal to 1 or 2, when Me represents tin or lead, m is equal to 5 and n is equal to 1, 2 or 3 when Me represents bismuth or antimony, and R" represents a hydrogen atom or one of the meanings of R'.

18. A composition according to claim 17, wherein the copolymer containing the NH functions is a polyamide, a polyurethane or a polyurea.

19. A composition according to claim 17 wherein Me is tin.

20. Formed objects, characterized in that they are composed of a composition according to claim 17.

* * * * *